(12) United States Patent
Van Eerden et al.

(10) Patent No.: US 6,457,704 B1
(45) Date of Patent: Oct. 1, 2002

(54) COIL SPRING NOISEGUARD FOR A VEHICLE SUSPENSION

(75) Inventors: Richard Van Eerden, Grand Rapids, MI (US); Chris Galea, Sterling Heights, MI (US); Anthony VanRoon, Scarborough (CA)

(73) Assignee: Meritor Light Vehicle Technology, LLC., Troy, MI (US)

( * ) Notice: Subject to any disclaimer, the term of this patent is extended or adjusted under 35 U.S.C. 154(b) by 0 days.

(21) Appl. No.: 09/717,891

(22) Filed: Nov. 21, 2000

(51) Int. Cl.[7] .................................................. F16F 1/12
(52) U.S. Cl. ........................ 267/179; 267/166; 267/169; 267/287
(58) Field of Search ..................... 267/33, 166, 167, 267/169, 166.1, 179, 180, 249, 286, 287, 220; 280/124.146, 124.147, 124.145, 124.151, 124.154, 124.155

(56) References Cited

U.S. PATENT DOCUMENTS

| | | | |
|---|---|---|---|
| 4,614,333 A | 9/1986 | Gaylord | |
| 4,779,854 A | 10/1988 | Idigkeit et al. | |
| 4,830,348 A | 5/1989 | Seyler | |
| 4,856,765 A | 8/1989 | Kohno et al. | |
| 5,251,928 A | 10/1993 | Maeda | |
| 5,299,786 A | 4/1994 | Godin | 267/33 |
| 5,421,565 A * | 6/1995 | Harkrader et al. | 267/220 |
| 6,149,171 A * | 11/2000 | Bono et al. | 280/124.179 |

* cited by examiner

Primary Examiner—Pam Rodriguez
(74) Attorney, Agent, or Firm—Carlson Gaskey & Olds

(57) ABSTRACT

A noise reduction assembly includes a substantially annular isolator and a substantially annular noise guard extending therefrom. The isolator and the noise guard sandwich a first convolution of a vehicle suspension coil spring. The noise guard is aligned to the coil spring such that the noise guard extends between the first and second convolutions between 1.0 and 1.4 turns of the coil spring to prevent contact in this area.

25 Claims, 2 Drawing Sheets

COIL SPRING NOISEGUARD FOR A VEHICLE SUSPENSION

BACKGROUND OF THE INVENTION

The present invention relates to a vehicle suspension system, and more particularly to a noise suppression device for coil springs.

Vehicle suspensions commonly include a coil spring at the front two and possibly all four wheels for supporting the vehicle body and frame. The springs isolate the body and frame from roadway shocks and undulations encountered by the wheels, so that occupants of the vehicle may ride in comfort while shock absorbing members dampen oscillations of the body on the springs.

Typical suspension springs must provide a stiffness or compressibility which is a compromise between a smooth ride and good vehicle handling while being mountable in a relative compact arrangement. The coil springs are therefore designed to operate with only a limited clearance between each convolution of the coil spring. In some instances, certain operating conditions may result in one convolution contacting another convolution. This contact can result in undesirable noise and reduced.

It is known to add an additional member such as a hose shaped sleeve on the coils to minimize noise during contact therebetween. Disadvantageously, the sleeve may be difficult to install.

Accordingly, it is desirable to provide a coil spring noise reduction member which is relatively uncomplicated and easy to install, and which guards against coil contact noise, while also isolating the spring from the contacting seat in the system.

SUMMARY OF THE INVENTION

The noise reduction assembly according to the present invention includes an isolator and a not necessarily annular noise guard extending therefrom. The isolator and the noise guard sandwich at least a portion of a first convolution of a vehicle suspension coil spring.

Applicant has determined that the majority of contact between the convolutions of the coil spring is generated by between approximately 1.0 and 1⅜ turns of the coil spring, i.e., between the first and second convolutions. The noise guard is aligned to the coil spring such that the noise guard extends between the first and second convolutions between approximately 1.0 and 1 ⅜ turns of the coil spring to prevent contact in this area.

The present invention therefore provides an uncomplicated coil spring noise reduction assembly, which guards against the coil contact noise, and isolates the spring from transmitted noise.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
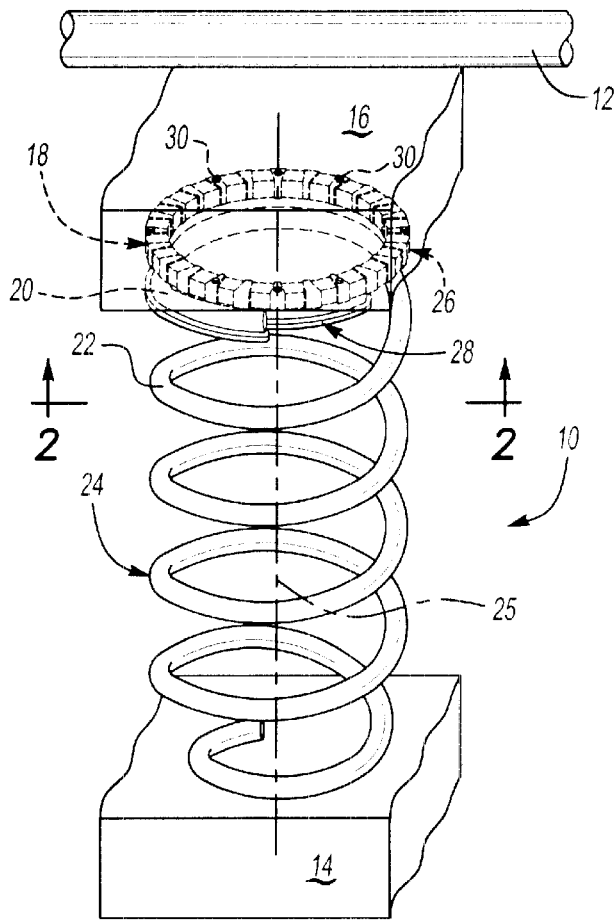
FIG. 1 is a general schematic view of a vehicle suspension system according to the present invention.

FIG. 1 illustrates a coil spring assembly 10 for a vehicle suspension system (illustrated schematically at 12). The coil spring assembly 10 is generally mounted between a vehicle suspension component (illustrated schematically at 14) and a vehicle frame (illustrated schematically at 16). A noise reduction assembly 18 is preferably mounted adjacent a second convolution 22 of a coil spring 24 which defines a first axis 25. Preferably, the noise reduction assembly 18 is mounted adjacent to the spring seat or mount at 1 or both ends of the spring. In vehicle frame 16, however, the noise reduction assembly 18 may alternatively or additionally be mounted adjacent the suspension component 14.

Figure 2:
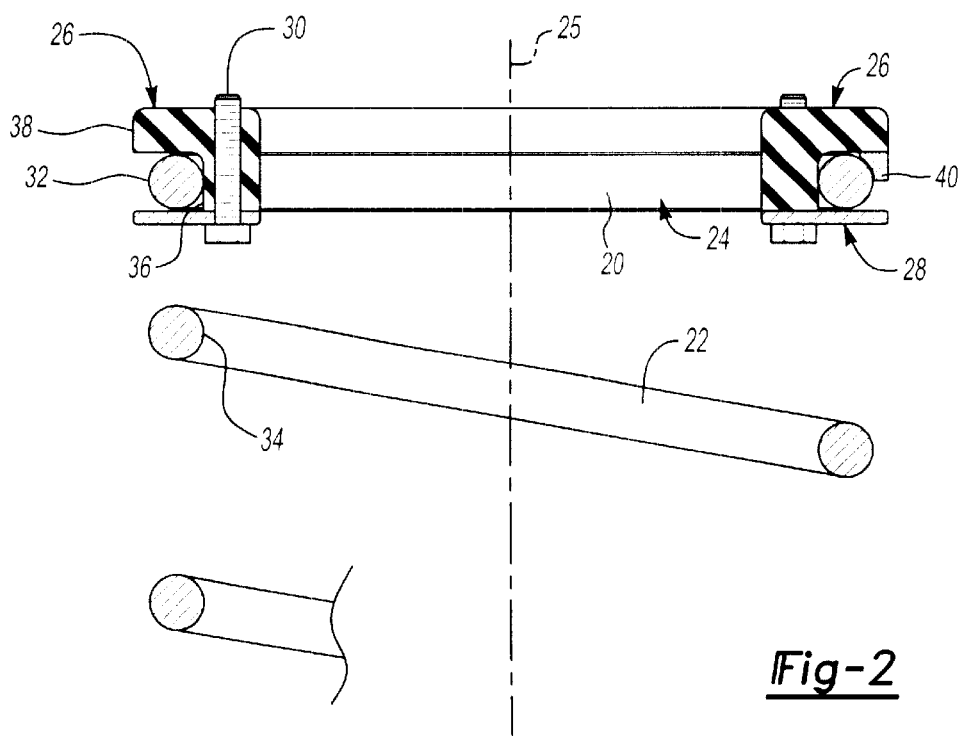
FIG. 2 is a sectional view of the noise reduction assembly taken along line 2—2 of FIG. 1.

The noise reduction assembly 18 includes a substantially annular isolator 26 and a substantially annular noise guard 28 extending therefrom. The isolator 26 is preferably manufactured of a polymer material such as rubber. The noise guard 28 is preferably a plate like member manufactured of polyurethane material. The noise guard 28 may be attached to the isolator by a fastener 30 such as a multiple of self threading screws or may be formed directly thereto (FIG. 2). It should be understood that although a substantially annular noise guard is illustrated in the disclosed embodiment a noise guard forming only a partial or non-annular periphery will benefit from the present invention.

Referring to FIG. 2, each convolution 20, 22 of the coil spring 24 defines an outer convolution periphery 32 and an inner convolution periphery 34. The isolator 26 preferably defines a first isolator periphery 36 and a second isolator periphery 38. The first isolator periphery 36 preferably fits within the inner convolution periphery 34 and the second isolator periphery 38 is approximately equal to the outer convolution periphery 32. The isolator 26 is manufacture of a resilient material such that the isolator 26 fits into the coil spring 24. In other words, the isolator 26 fits within the inner convolution periphery 34. The assembly 18 presumably fits to the spring 24 such that the assembly 18 is retrieved to the spring 24 during handling and shipping.

A retainer 40 may extend from the second outer periphery 36. The retainer 40 may extend about the entire second isolator periphery 38 or be an individual member which is mounted at a single location about the second isolator periphery 38. The first convolution 20 is preferably sandwiched between the retainer 40 and the first isolator periphery 36 such that the noise reduction assembly 18 is securely mountable to the coils spring 24.

Figure 3:
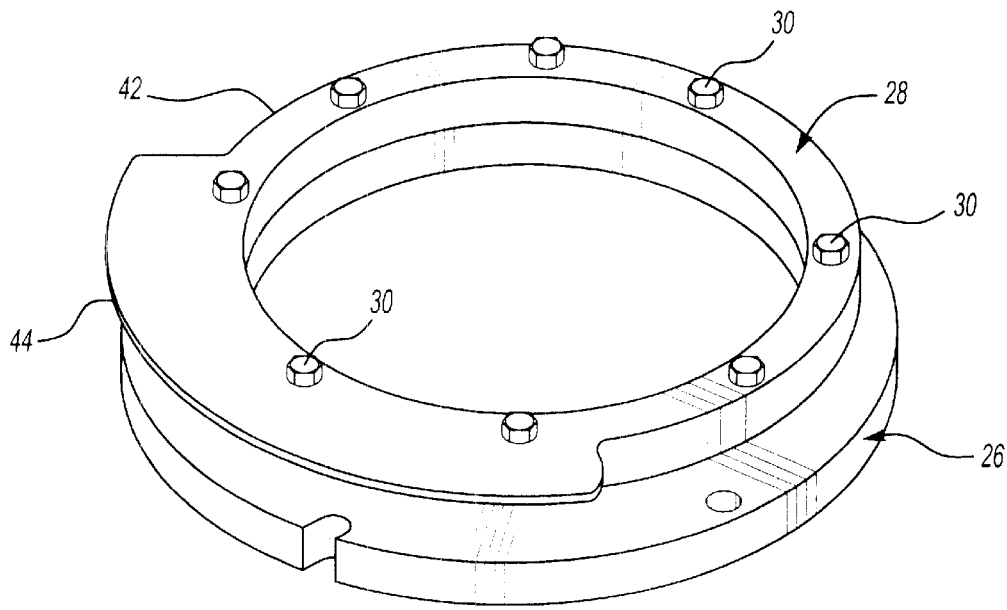
FIG. 3 is an expanded view of the noise reduction assembly according to the present invention.

Referring to FIG. 3, the noise guard 28 includes a first noise guard outer periphery 42 and a second noise guard outer periphery 44. The second noise guard outer periphery 44 is greater than the first noise guard outer periphery 42. Preferably, the second noise guard outer periphery 44 extends approximately as far as the outer convolution periphery 32. (FIG. 4) The isolator 28 and the second noise guard outer periphery 44 will at least partially sandwich the first convolution 20 when the noise reduction assembly 18 is mounted to the coils spring 24 (FIG. 2).

Figure 4:
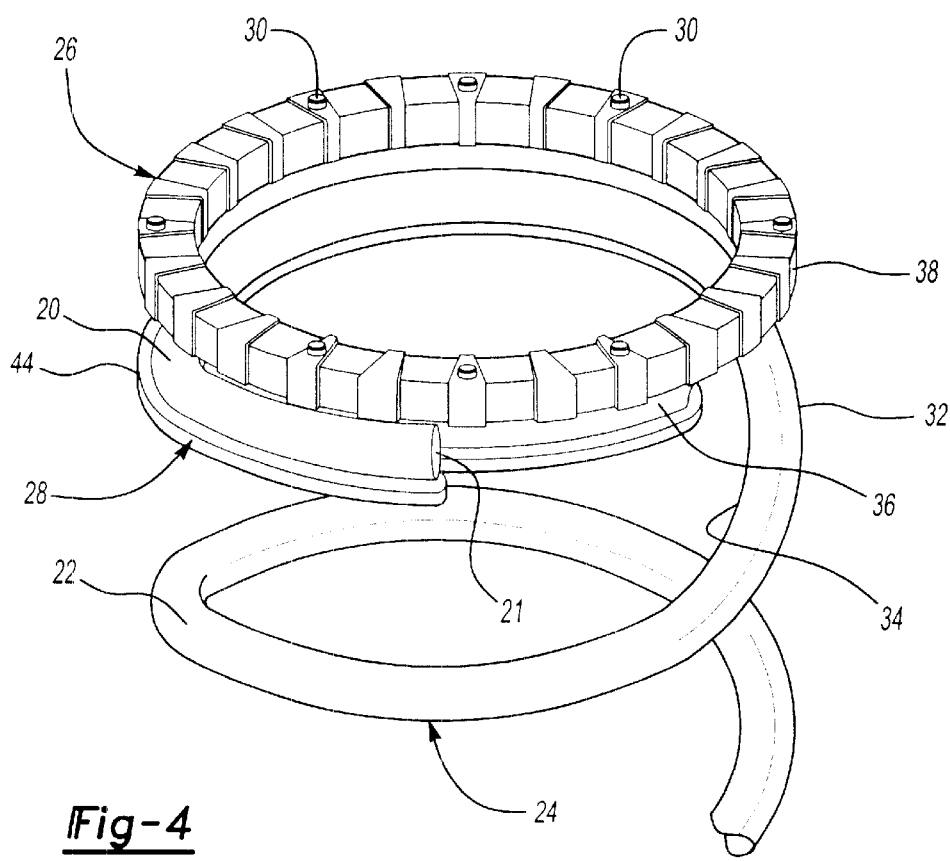
FIG. 4 is an expanded view of the noise reduction assembly mounted to a coils spring.

Referring to FIG. 4, also to the second noise guard outer periphery 44 extends about a semi-circular periphery from an end 21 of the first convolution 20 to approximately one third the periphery of the first convolution 20. In other words, the second noise guard outer periphery 44 extends for approximately one third the periphery of the first noise guard outer periphery 42 and is located between the first and second 20,22 convolutions. Applicant has determined that the majority of contact between the convolutions of the coil spring 24 is generated by between approximately 1.0 and 1 3/8 turns of the coil spring 24, i., between the first and second 20,22 convolutions. The noise guard 26 is therefore aligned to the coil spring 24 such that the second noise guard outer periphery 44 extends between the first and second 20,22 convolutions approximately between 1.0 and 1 3/8 turns of the coil spring 24 to prevent contact in this area.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A coil spring assembly for a vehicle suspension comprising:
    a coil spring having a first and a second convolution, said coil spring defining a first axis;
    an annular isolator mounted adjacent said first convolution; and
    a rigid noise guard extending from said isolator, said rigid noise guard extending between said first and said second convolutions said isolator and said noise guard sandwich at least a portion of said first convolution therebetween, said isolator comprising a first outer periphery and a second outer periphery greater than said first outer periphery, said second outer periphery extending to an outer convolution periphery defined by said first convolution and said first outer periphery mounted substantially within an inner convolution periphery defined by said first convolution.

2. The coil spring assembly as recited in claim 1, wherein said second outer periphery includes a retainer, said first convolution mountable between said first outer periphery and said retainer.

3. The coil spring assembly as recited in claim 1, wherein said isolator and said noise guard sandwich at least a portion of said first convolution therebetween.

4. The coil spring assembly as recited in claim 1, wherein said noise guard includes a first noise guard outer periphery and a second noise guard outer periphery, said second noise guard outer periphery greater than said first noise guard outer periphery.

5. The coil spring assembly as recited in claim 4, wherein said second noise guard outer periphery extends about a semi-circular periphery of said first noise guard outer periphery.

6. The coil spring assembly as recited in claim 4, wherein said second outer noise guard periphery extends about a semi-circular periphery from an end of said first convolution to approximately one third the periphery of said first convolution.

7. The noise reduction assembly as recited in claim 1, wherein said isolator is substantially L-shaped in cross section.

8. The noise reduction assembly as recited in claim 1, wherein said isolator is flat when mounted to the coil spring.

9. The noise reduction assembly as recited in claim 1, wherein said isolator and said noise guard are uninterrupted annular members.

10. The noise reduction assembly as recited in claim 1, wherein said noise guard extends perpendicular to an axis defined by the coil spring.

11. A coil spring assembly for a vehicle suspension comprising:
    a coil spring having a first and a second convolution, said coil spring defining a first axis;
    a substantially annular isolator mounted adjacent said first convolution; and
    a substantially annular noise guard extending from said isolator, said noise guard includes a first noise guard outer periphery and a second noise guard outer periphery, said second noise guard outer periphery greater than said first noise guard outer periphery said second noise guard outer periphery extending between said first and said second convolutions such that said isolator and said second noise guard outer periphery at least partially sandwich said first convolution therebetween.

12. The coil spring assembly as recited in claim 11, wherein said second outer noise periphery extends about a semi-circular periphery from an end of said convolution for approximately one third the periphery of said first convolution.

13. A noise reduction assembly for use with a vehicle suspension having a coil spring, said noise reduction assembly comprising:
    an isolator; and
    a noise guard extending from said isolator, said noise guard extending between a first and a second convolution of the coil spring, said noise guard includes a first outer periphery and a second outer periphery, said second outer periphery greater than said first outer periphery.

14. The noise reduction assembly as recited in claim 13, wherein said second outer periphery extends about a semi-circular periphery of said first outer periphery.

15. A noise reduction assembly for use with a vehicle suspension having a coil spring, said noise reduction assembly comprising:
    an isolator comprising a first outer periphery and a second outer periphery, said second outer periphery greater than said first outer periphery; and
    a noise guard extending from said isolator, said noise guard extending between a first and a second convolution of the coil spring.

16. A coil spring assembly for a vehicle suspension comprising:
    a coil spring having a first and a second convolution, said coil spring defining a first axis;
    an isolator mounted adjacent said first convolution, said isolator comprising a first outer periphery and a second outer periphery greater than said first outer periphery, said second outer periphery extending to an outer convolution periphery defined by said first convolution and said first outer periphery mounted substantially within an inner convolution periphery defined by said first convolution; and
    a noise guard extending from said isolator, said noise guard extending between said first and said second convolution.

17. A coil spring assembly for a vehicle suspension comprising:
    a coil spring having a first and a second convolution, said coil spring defining a first axis;

an isolator mounted adjacent said first convolution; and a noise guard extending from said isolator, said noise guard extending between said first and said second convolution, said noise guard includes a first noise guard outer periphery and a second noise guard outer periphery, said second noise guard outer periphery greater than said first noise guard outer periphery.

18. The coil spring assembly as recited in claim 17, wherein said second noise guard outer periphery extends about a semi-circular periphery of said first noise guard outer periphery.

19. A noise reduction assembly for use with a vehicle suspension having a coil spring said noise reduction assembly comprising:

an isolator; and a rigid noise guard extending from said isolator, said rigid noise guard extending between a first and a second convolution of a coil spring, said isolator and said noise guard in at least partial contact with said first convolution, said noise guard comprising a first outer periphery and a second outer periphery, said second outer periphery greater than said first other periphery.

20. The noise reduction assembly as recited in claim 19, wherein said second outer periphery extends about a semi-circular periphery of said first outer periphery.

21. The noise reduction assembly as recited in claim 19, wherein said noise guard extends perpendicular to an axis defined by the coil spring.

22. A noise reduction assembly for use with a vehicle suspension having a coil spring, said noise reduction assembly comprising:

an isolator, said isolator includes a first outer periphery and a second outer periphery, said second outer periphery greater than said first outer periphery; and a rigid noise guard extending from said isolator, said rigid noise guard extending between a first and a second convolution of a coil spring, said isolator and said noise guard in at least partial contact with said first convolution.

23. The noise reduction assembly as recited in claim 22, wherein said isolator is substantially L-shaped in cross section.

24. The noise reduction assembly as recited in claim 22, wherein said isolator is flat when mounted to the coil spring.

25. A coil spring assembly for a vehicle suspension comprising:

a coil spring having a first and a second convolution, said coil spring defining a first axis;

an isolator mounted adjacent said first convolution, said isolator includes a first outer periphery and a second outer periphery greater than said first outer periphery, said second outer periphery extending to an outer convolution periphery defined by said first convolution and said first outer periphery mounted substantially within an inner convolution periphery defined by said first convolution;

a noise guard extending from said isolator, said noise guard extending between said first and said second convolution; and a retainer extending from said second outer periphery, said first convolution mountable between said first outer periphery and said retainer.

* * * * *